United States Patent [19]
Reid

[11] Patent Number: 5,944,989
[45] Date of Patent: Aug. 31, 1999

[54] SPLIT-FLOW WATER FILTRATION APPARATUS

[76] Inventor: Roger P. Reid, P. O. Box 1359, Caldwell, Id. 83605

[21] Appl. No.: 08/678,484

[22] Filed: Jul. 9, 1996

[51] Int. Cl.[6] ............................................. B01D 15/00
[52] U.S. Cl. ...................... 210/205; 210/257.1; 210/284; 210/446; 210/449; 210/753; 210/764
[58] Field of Search ................................ 210/284, 257.1, 210/257.2, 198.1, 199, 205, 282, 435, 446, 449, 753, 764; 422/261

[56] References Cited

U.S. PATENT DOCUMENTS

| | | | |
|---|---|---|---|
| 2,027,410 | 1/1936 | Weir | 210/284 |
| 2,420,115 | 5/1947 | Walker et al. | 210/284 |
| 2,809,158 | 10/1957 | Yustich | 210/284 |
| 2,992,986 | 7/1961 | Ingram | 210/284 |
| 3,542,199 | 11/1970 | Bray | 210/257.2 |
| 3,554,906 | 1/1971 | Wolf | 210/284 |
| 3,902,849 | 9/1975 | Barak et al. | 210/284 |
| 4,062,777 | 12/1977 | Tsuruta et al. | 210/284 |
| 4,461,706 | 7/1984 | Siegers | 210/284 |
| 4,648,976 | 3/1987 | Chen | 210/284 |
| 4,882,061 | 11/1989 | Petrucci et al. | 210/257.2 |
| 5,037,547 | 8/1991 | Burrows | 210/257.2 |
| 5,068,029 | 11/1991 | Tiggelbeck et al. | 210/284 |
| 5,082,557 | 1/1992 | Grayson et al. | 210/109 |
| 5,232,590 | 8/1993 | Reid | 210/257.2 |
| 5,248,417 | 9/1993 | Reid | 210/195.1 |

Primary Examiner—Robert J. Popovics
Attorney, Agent, or Firm—Ken J. Pedersen; Barbara S. Pedersen

[57] ABSTRACT

Embodiments of a method and apparatus for filtering or treating water are shown and described, each embodiment being for multiple-stage processing of water, with storage intermediate between the stages. Water is passed through a first zone of a filter housing cavity and conducted through an intermediate port to storage. When water is demanded by a usage device, water flows in reverse from storage back into the filter, to flow through the second zone for a second stage of filtering/treatment, and then out an outlet port to the usage device. Water may also flow from the water source directly through the first and second zones and to the usage device, without intermediate storage. Preferably, both first and second zones are contained and axially arranged within a single filter housing. Preferably, water flows bi-directionally through a central return tube, or other axial passage through the first zone media, so that this tube or axial passage may be used as the collector for the first-zone effluent and also the distributor for the second zone feed.

4 Claims, 7 Drawing Sheets

SPLIT-FLOW WATER FILTRATION APPARATUS

BACKGROUND OF THE INVENTION

1. Field of the Invention

This invention relates generally to water filter or treatment systems, and, more specifically, to systems including intermediate storage for filtered or treated water.

2. Related Art

Conventional filter systems permit water to flow in a single pass through filter or treatment media to a storage tank, water tap, or other usage device. When additional filtering of stored water is desired to remove contamination or biocides immediately before use, conventional systems typically require multiple filter canisters and complicated valving and piping.

Reid (U.S. Pat. No. 5,248,417) discloses a double-flow-through system using a single filter housing. In this system, water flows through a single bed of filter media and then through a combination outlet-inlet port to a storage tank. When a tap or faucet is opened, the stored water flows back through the combination port into the filter housing to flow again through the filter media bed and then out to the tap. Thus, the Reid '417 system provides two passes through a single bed of filter media, with intermediate storage between the two passes.

The Reid '417 apparatus includes a pair of check valves to control flow to and from the combination port, and, thus, to and from storage. When the water tap is closed, unfiltered water enters the upper portion of the filter housing through the inlet port and is prevented by a cup-type check valve from flowing directly to the combination outlet-inlet port. The water passes a first time through the media and flows up through a filter tube to the combination port. A slit-type check valve disposed at the top of the filter tube prevents water from flowing from the combination port back into the filter tube. Once the water tap is opened, the cup-style check valve allows water to flow from storage through the combination port, through the cup check valve into the top portion of the filter housing, through the media a second time, and then to the tap.

Reid (U.S. Pat. No. 5,232,590) discloses a water filtration apparatus with an internal by-pass for conducting water from a water source to a storage tank without passing through the filter media. When the tap or faucet is opened, water then flows back from the storage tank into the filter housing, through the filter media, out the outlet port, and out of the faucet.

Grayson, et al. (U.S. Pat. No. 5,082,557) discloses a filter control head for directing water to various locations. The control head can direct water to a first filter canister, to a drain, and to a storage tank. When a downstream usage device demands water, purified water may then flow from the storage tank, back to the control head, and then to a separate, second filter canister and a downstream usage device.

SUMMARY OF THE INVENTION

An object of the present invention is to provide an economical system with at least two stages of filtration or treatment and with intermediate storage. Another object of the invention is to provide an apparatus wherein the first and second filtration/treatment zones are both contained in a single filter housing. Another object of the invention is to provide a system having two or more filtration zones that each may be operated at differing flowrates.

The present invention comprises a filter housing comprising first and second filtering zones in series, and removal means and return means for conducting liquid to and from storage in between the zones. Separate, intermediate outlet and inlet ports may extend through the housing wall, or, preferably, a single, intermediate combined outlet-inlet port may accommodate flow in both the outward (to storage) and the inward (from storage) directions.

In a preferred embodiment, the intermediate outlet and inlet ports are combined into a single port, which is in fluid communication with an elongated filter tube extending through the first zone. The bottom of the filter tube is located near the bottom of the first zone and near the top of the second zone. Therefore, the filter tube collects water after passage through the first zone and allows it to flow out of the intermediate port to storage. Upon opening of a tap, which is in fluid communication with the outlet of the second zone, the stored water flows back into the intermediate port and into the filter tube, out of the bottom of the filter tube, through the second zone, and through an outlet port to the water tap.

The multiple zones of the present invention may include one or more beds or layers comprising filter media, treatment media, or void space. The zones may be designed for either axial flow, radial flow, or both types of flow distribution.

DETAILED DESCRIPTION OF THE PREFERRED EMBODIMENT

Figure 1:
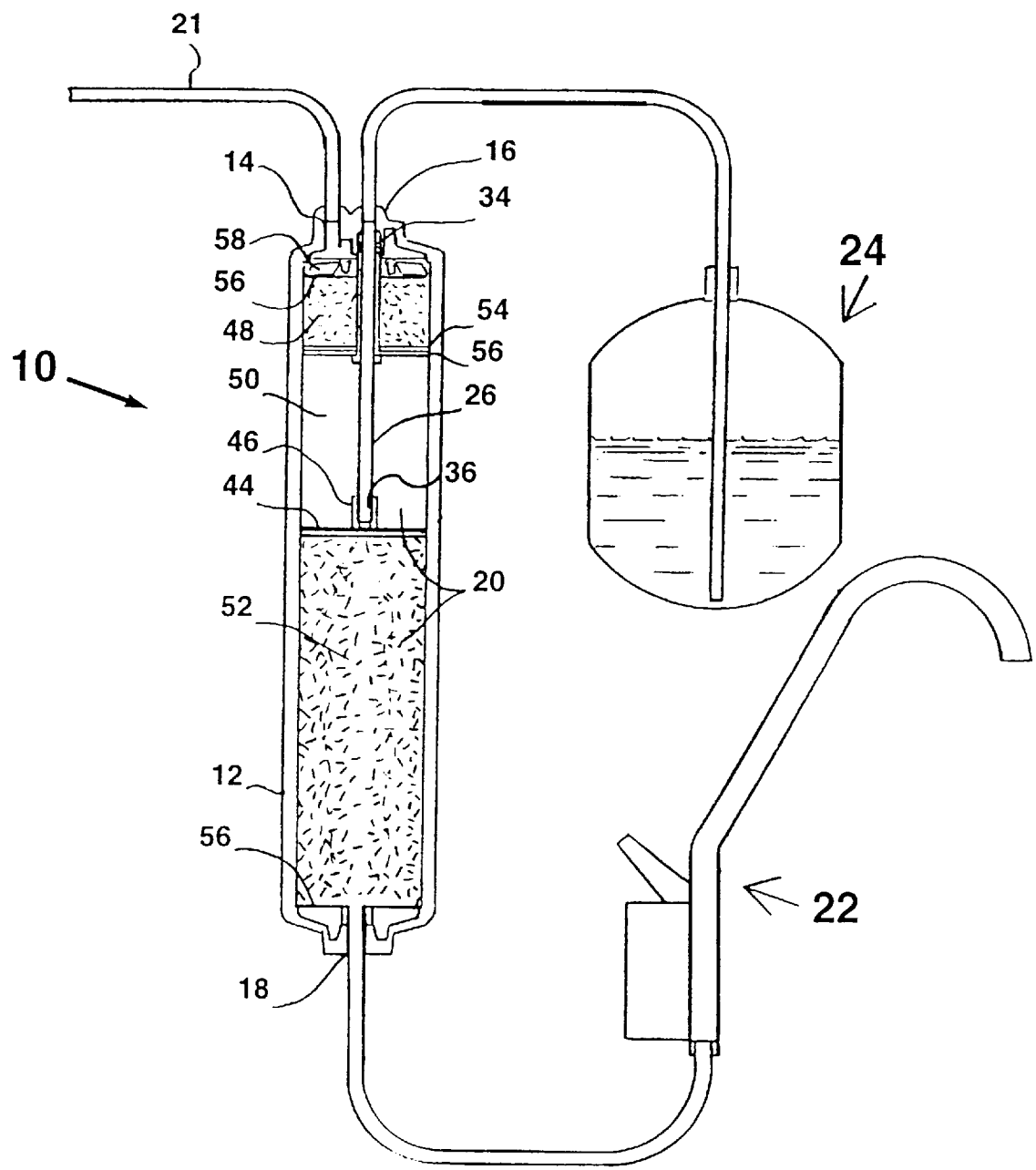
FIG. 1 is a cross-sectional side view of one embodiment of the invention having axial-flow first and second filtration zones.

Referring to the Figures, there are shown several, but not the only, embodiments of the invented split-flow water filtration apparatus. In FIG. 1, there is shown the preferred embodiment, including a central return tube that both collects water after the first stage of filtration and distributes water to the second stage of filtration.

Filter 10 comprises a filter housing 12 with inlet port 14, intermediate port 16, and outlet port 18. The housing 12 is a generally cylindrical shape with an interior cavity 20 for holding filter or treatment media. The inlet port 14 and intermediate port 16 extend through a first wall, preferably the top wall 15 of the housing 12, and the outlet port 18 extends through a second wall, preferably the bottom wall 19 of the housing 12. The inlet port 14 is in fluid communication with a water source 21 and the outlet port 18 is in fluid communication with a water usage device, such as a tap 22.

The intermediate port 16 is connected to and in fluid communication with storage tank 24. Associated with storage tank 24 is a pressurizing means, for pressurizing or pumping liquid back to the filter 10 when the tap 22 is opened. The pressurizing means may be apparatus to pressurize the tank, pressurize a bladder, or to pump liquid.

The central return tube 26 extends down through the first zone 28 of the filter 10 and is in fluid communication with the intermediate port 16. The top end 30 of the return tube 26 may be sealed in the filter head by one or more O-rings 34. The bottom end 36 of the return tube 26 extends to the bottom 38 of the first zone 28 and to near the top 40 of the second zone 42. The tube bottom end 36 is held in the center of the cavity 20 by a retaining means, which is preferably a radially-disposed support disk 44 having a tube retainer 46 at the center of the disk 44 for connection to the tube bottom end 36.

The first zone 28 comprises a first bed 48 of resin followed by a dwell chamber 50, which is a void space not containing any filter or treatment media. The second zone 42 is a filter bed 52, containing a filter media such as activated carbon. Resin bed 48, dwell chamber 50, and filter bed 52 are separated/supported by support disks 54 and felt 56. The resin bed 48 is held in compaction by a spring disk 58, and the filter bed 52 is supported by felt 56 on top of the bottom interior surface of the housing 12. Disks 54, felt 56, and spring disk 58 support and/or separate the media beds while letting fluid pass from one bed or zone to the next, as is well-known in the art of filters.

The preferred embodiment of FIG. 1 is designed for anti-bacterial treatment with an iodinated resin, followed by residence time in the dwell chamber 50 for extended contact between bacteria and the iodide/iodine species in the water for a high percentage of bacteria destruction. The dwell chamber 50, which is preferably empty except for the water being treated, maximizes residence time for a given volume of filter housing, as is disclosed in Hughes (U.S. Pat. No. 5,407,573). The storage tank 24 provides additional contact time, and the second zone 42 filters and removes biocide from the water immediately before use.

Figure 2A:
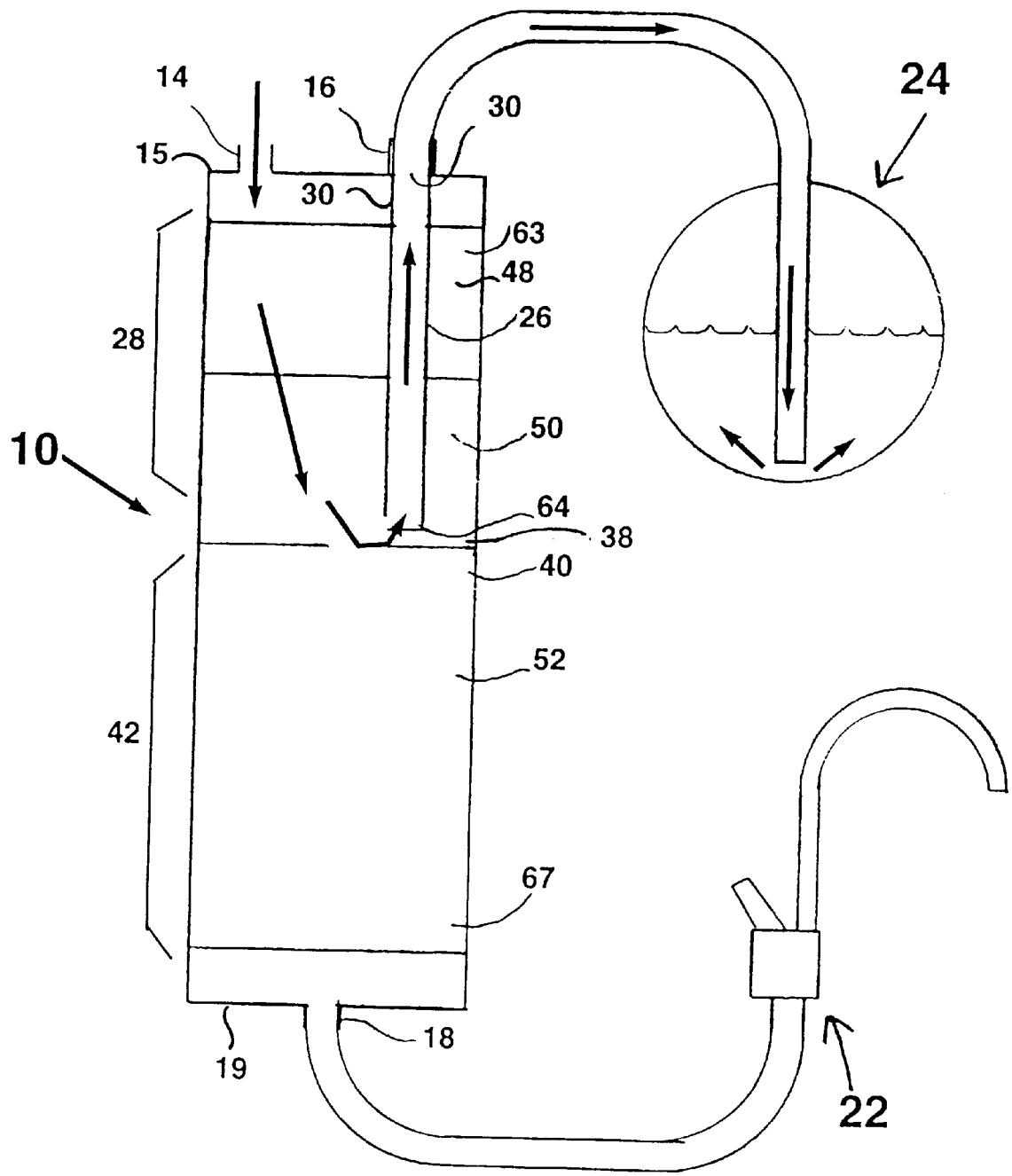
FIG. 2A is a schematic cross-sectional side view of the embodiment of FIG. 1, showing liquid flow when the tap is closed and the storage tank is filling.

In use, when the tap 22 is closed, water or other fluid from the source enters the filter 10 through inlet port 14 and flows axially down through the first bed 48 and into the dwell chamber 50. From the dwell chamber 50, the water flows up through the central return tube 26 to the intermediate port 16 and to the storage tank 24. This first stage filtration flowscheme, shown schematically in FIG. 2A, continues until the storage tank 24 is full or until the tap 22 is opened to demand water for use. When the storage tank 24 is full and the tap is closed, water flow stops unless the system is fitted with an optional drain for maintaining a small flow through one or more of the filter zones.

Figure 2B:
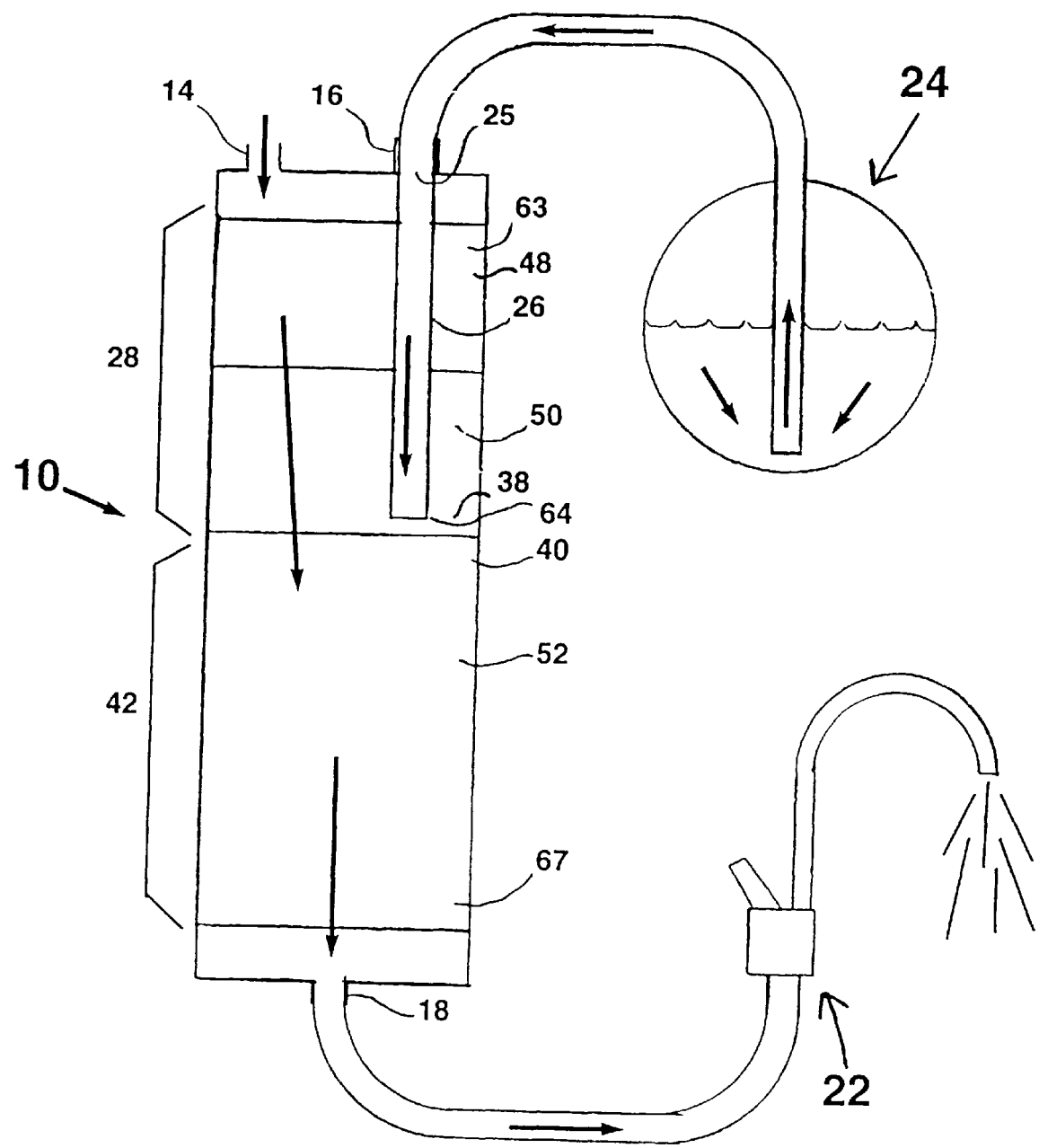
FIG. 2B is a schematic cross-sectional side view of the embodiment of FIG. 2A, showing liquid flow when the tap is open and the storage tank contains liquid.
Figure 2C:
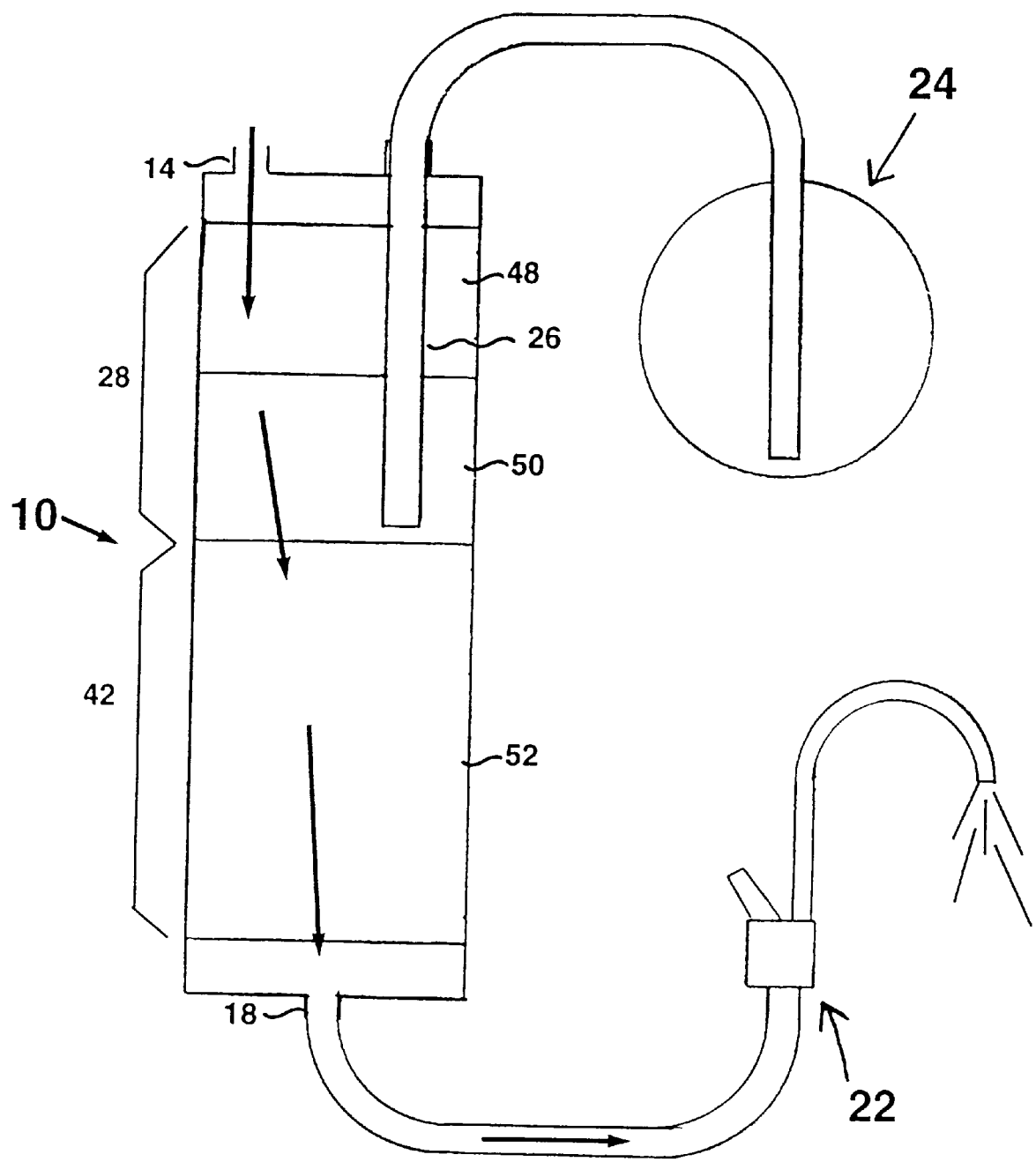
FIG. 2C is a schematic cross-sectional side view of the embodiment of FIG. 2A, showing liquid flow when the tap is open and the storage tank is empty.

When the tap 22 is opened, as shown in FIG. 2B, water flows in the reverse direction from the storage tank 24, enters the tube top opening 25, flows axially down through the tube 26 and out the tube bottom opening 64, through the second zone 42, and out the outlet port 18. In most designs, when the tap is open, some water also flows from the inlet port 14, down through both the first zone 28 and second zone 42, and out the outlet port 18. When the tap 22 is open but the storage tank 24 is empty, as shown in FIG. 2C, water continues to flow from the inlet port 14 through both zones 28, 42 and out the outlet port 18.

The split-flow filter 10 system allows the flowrates through the first zone 28 and second zone 42 to be different. The flowrates through the first and second zones are determined by the pressures of the water source and storage tank, the various pressure drops through the system, etc., as is known in filter design and fluid mechanics. Thus, when the tap 22 is open and the water flowing to the tap is a combination of water from storage 24 and water that has come from the inlet port 14 directly through the two zones, the relative proportions of these two water types is also a function of tank pressure, source pressure, pressure drop, etc. In the preferred system, the flow of water from storage 24 through the second zone 42 to the tap 22 is relatively fast compared to the flow of water either through the first zone 28 to storage 24 or through the first zone 28, second zone 42, and tap 22.

In FIGS. 1 and 2A–C, the first zone 28 is portrayed as having a central return tube 26, which is one example of a support structure defining an axial passage through the first zone 28. Alternative embodiments may have other means for creating an internal axial passage through the first zone media. For example, a solid media may have an internal media cavity, defined by the media inside diameter and running axially through the media. In such a solid media embodiment, a separate support structure at the media's inside diameter is normally unnecessary. Such an embodiment may be seen in the radial flowscheme of FIGS. 3A and 3B. Alternatively, other radial-flow embodiments may include support structure for creating an axial passage through media. For example, for creating a passage through granular media, a slotted or otherwise liquid-permeable return tube may be used in the first and/or second radial flow zones as shown in FIG. 3C by return tube 26" in embodiment 110.

Figure 3A:
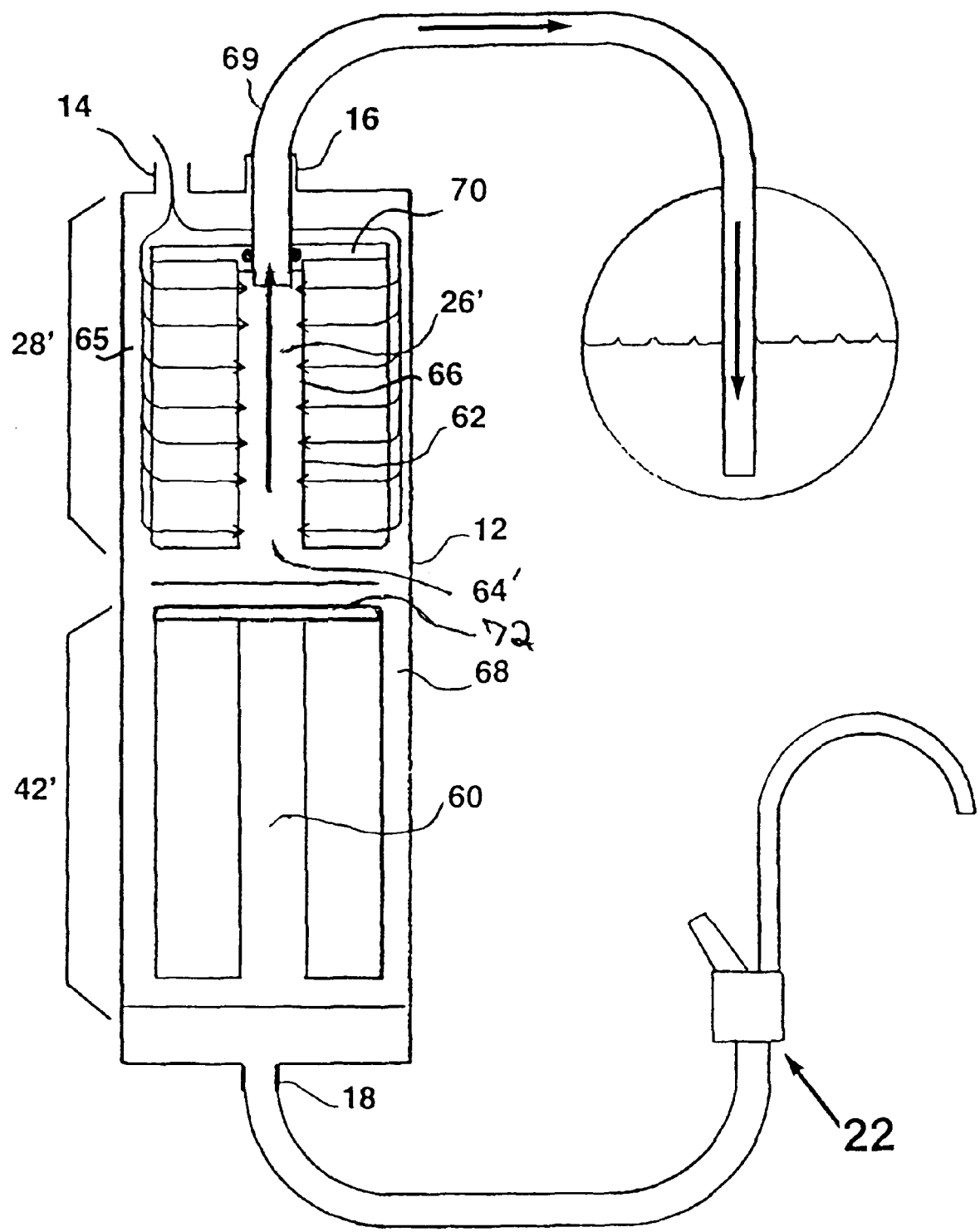
FIG. 3A is a schematic cross-sectional side view of an alternative embodiment of the invention having radial-flow first and second filtration zones, showing liquid flow when the tap is closed and the storage tank is filling.
Figure 3B:
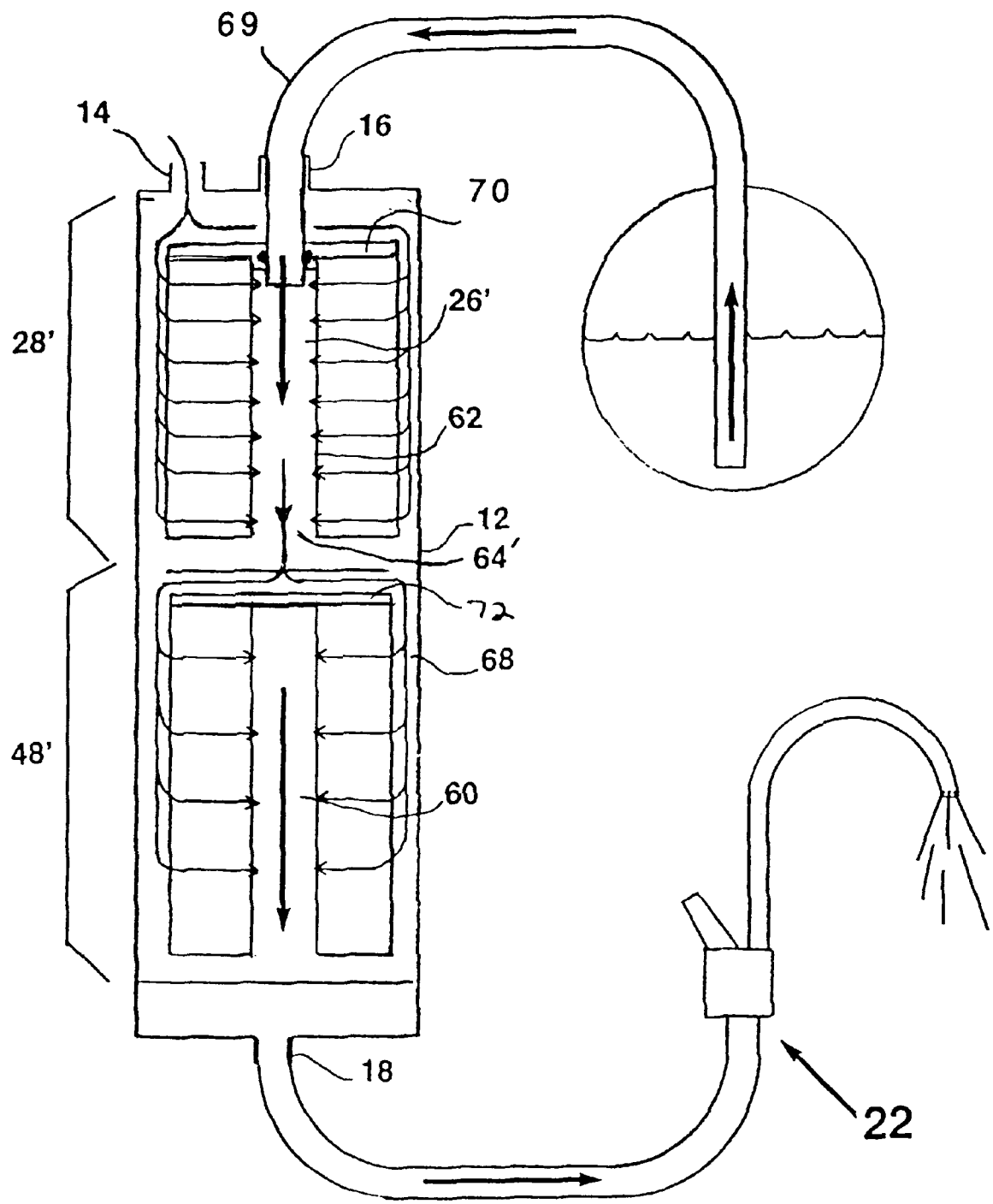
FIG. 3B is a schematic cross-sectional side view of the embodiment of FIG. 3A, showing liquid flow when the tap is open and the storage tank contains liquid.

In the radial-flow embodiment of FIG. 3A, unfiltered water enters the inlet port 14, flows radially through the first zone 28', flows out from the inside diameter 62 of the media into the media cavity 26', and flows up to the intermediate port 16 and to storage 24. When the tap 22 is opened, as in FIG. 3B, the stored water flows back into the intermediate port 16, down through the media cavity 26', out the bottom 64' of the cavity 26', and to the second zone 42'. In the second zone 42', the water flows radially into the second zone media cavity 60 formed by the inside diameter of the radial flow media, to the outlet port 18, and to the tap 22.

Included in the embodiment portrayed in FIGS. 3A and B is a sealing means resting on top of the media, for sealing the media to the tube 69 that extends through the intermediate port 16. The sealing member 70 has a plate covering the top end surface of the media and one or more o-rings for creating a seal between the member 70 and the tube 69. Alternatively, a sealing member may be designed to seal the media to the head of the filter at the intermediate port 16. Such an alternative embodiment includes a plate for covering the media, and a cylindrical extension upending to contact and seal with the intermediate port by the use of o-rings encircling the upper end of the cylindrical extension.

A sealing means is preferably located on the top end surface of the second zone media. The sealing means may be an end plate 72 that prevents water from entering media cavity 60 from the top. Both end plate 72 and the first zone sealing member 70 may be attached to media by, for example, hot gluing.

Therefore, in both axial-flow and radial flow embodiments, the first and second zones are in series-flow liquid communication, wherein the effluent of the first zone flows directly, or by way of storage, to the inlet of the second zone. The first zone inlet may be either the top end 63 of a axial-flow bed or the outer annular surface 65 of a radial-flow bed. The first zone outlet may be either the bottom end 38 of an axial-flow bed or the inner annular surface 66 of a radial-flow bed. The inlet and outlet of an axial-flow second zone are at the top end 40 and bottom end 67 of the zone, respectively. The inlet and outlet of a radial-flow second zone are the outer annular and inner annular surfaces, respectively. Therefore, by saying the central return tube bottom opening 64 or the bottom 64' of the media cavity is "near the second zone inlet", it is meant that the bottom opening 64 or cavity bottom 64' may either be near the top end of an axial-flow bed (so that the first zone effluent flows axially down into the second zone) or near the top end of a radial-flow bed (so that the first zone effluent flows down to the annular feed 68 space and then radially into the second zone). Thus, the return tube bottom 64 or cavity bottom 64' is in fluid communication with the second zone inlet, whether the second zone is axial or radial.

Optionally, the present invention may include an adjustment means for shortening the length of the central return tube 26, 26', in order to adjust the location of the first and second zones in the filter cavity and change the portions of cavity used as first and second zones. In a axial-flow filter, for example, shortening or lengthening the return tube 26 changes the location of the first zone outlet and second zone inlet, and allows the filter cavity to be loaded with different volumes of first and second zone media.

Figure 4:
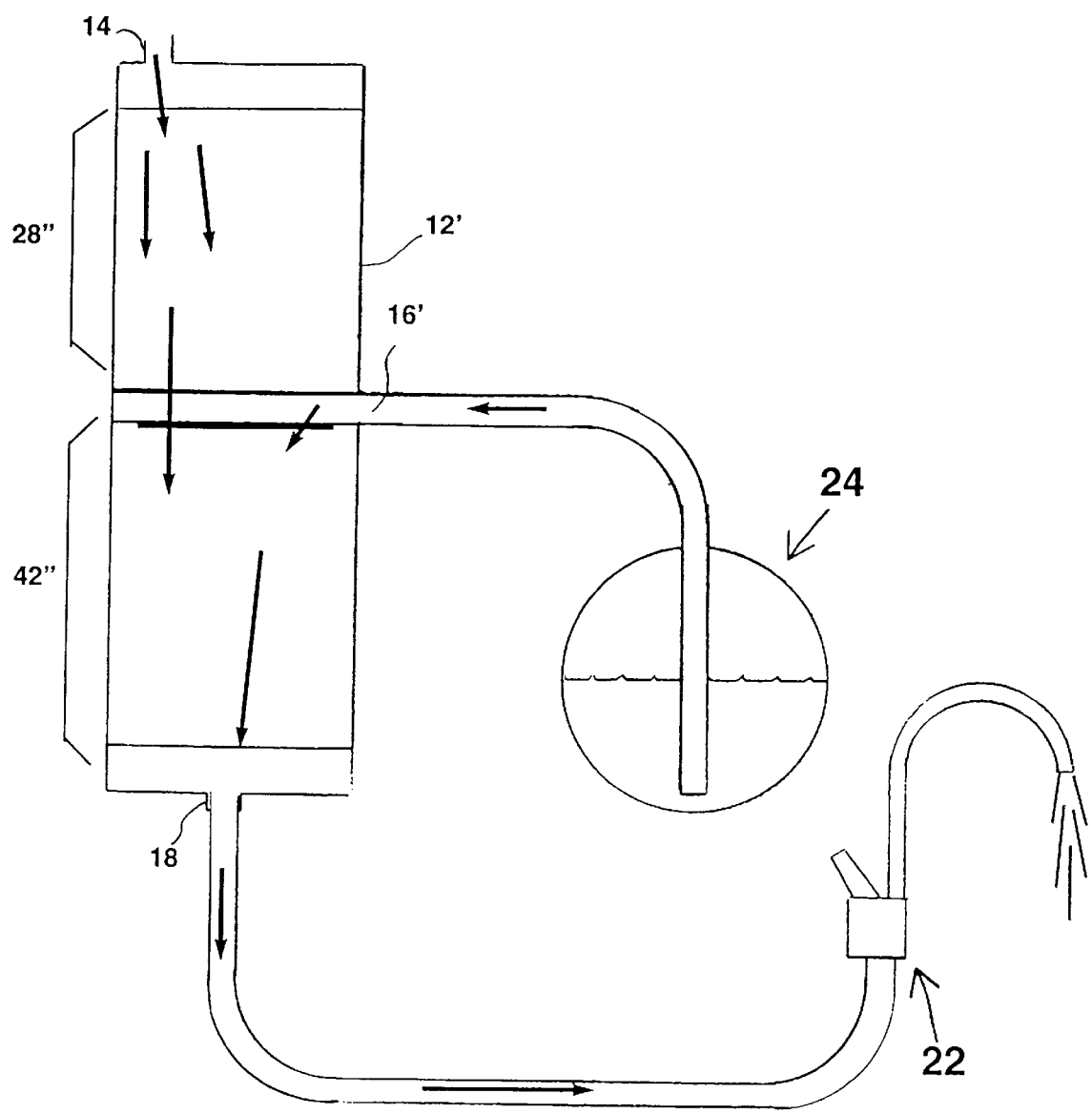
FIG. 4 is a schematic cross-sectional side view of an alternative embodiment of the invention, having a combined outlet-inlet intermediate port located part of the way down the filter housing sidewall, and showing liquid flow when the tap is open and the storage tank contains liquid.

FIG. 4 illustrates another alternate embodiment, in which the combined outlet-inlet intermediate port 16' is located in a third wall of the housing 12', that is, the sidewall of the preferably cylindrical housing 12'. In this embodiment, water flows through the first zone 28" and to storage through the intermediate port 16', which is located near the bottom of the first zone 28". When the tap 22 demands water, the stored water returns to the filter through the intermediate port 16', and flows through the second zone 42" to the tap 22. As in the other embodiments, the pressure balance at the various locations through the system would control the flows through the first zone 28", intermediate port 16', and second zone 42" of this filter and would control the ratio of storage water/first-zone-water flowing to the second zone and out to the tap.

The invention may include more than two stages, with removal and return of the liquid intermediate between all or some of the stages. Preferably, the stages are accomplished in zones that are all contained in a single filter housing, for convenient and economical installation and use, and for minimizing piping and valving. Also, the plurality of zones in the filter housing may all be axial-flow, as illustrated in FIG. 1, may all be radial flow, as illustrated in FIG. 3, or some may be axial-flow and some may be radial. Conventional aspects of filter design, such as retainer disks, felt, o-rings, port connections, housing shape, etc., may be varied according to known filter art and still be within the scope of this invention.

The configuration of the filtering/treatment zones may be changed to accommodate various types of filter or treatment media. For example, desirable first zone media may include biocide resins, ion exchange resins for softening, demineralizing, desilicizing, or disinfecting, and resins for removal of tannin/organic, nitrate, and alkalinity, etc. Desirable second zone media may include felt wrap, pleated material, folded material, carbon, block activated carbon, granular carbon, etc. Many combinations and arrangements of media may be used, including a plurality of beds within a single zone.

In this Description and the Claims, the words "filtering", "filtration", "treatment", or "filtration media" are not intended to limit the invention to media which performs a particular function, but, rather, include media that removes material from a liquid, adds material to a liquid, otherwise transforms a liquid, or is inert to the liquid. The zones may also be empty or have spaces that are empty of media, as in the dwell chamber in FIG. 1. Also in the Description and Claims, the terms "up" or "down" are not intended to limit the invention to particular orientations relative to the ground or gravity, but are used to clarify directions of liquid flow relative to the apparatus.

Although this invention has been described above with reference to particular means, materials, dimensions, embodiments, and methods of installation, it is to be understood that the invention is not limited to these disclosed particulars, but extends instead to all equivalents within the scope of the following claims.

I claim:

1. A filtration apparatus for anti-bacterial treatment of a liquid from a source and for delivering the liquid to a tap, the apparatus comprising:

(a) a filter comprising:

a generally cylindrical housing having a top wall, a side wall, a bottom wall, and a longitudinal axis extending between the top wall and bottom wall, the housing defining an interior cavity having a first zone and a second zone in series-flow liquid communication, wherein the first zone and second zone each have a zone inlet and zone outlet, and wherein the first zone includes a first media bed near the inlet port and a dwell chamber near the first zone outlet, the first media bed containing biocide media, the dwell chamber being empty, and the second zone containing biocide-removal media, said housing including an inlet port near the top wall being in fluid communication with a liquid source and with said first zone inlet, an outlet port near the bottom wall in fluid communication with the said second zone outlet and with a tap, and a combination outlet-inlet intermediate port in said top wall, an elongated return tube extending axially through said first zone, the return tube having a top opening in fluid communication with said intermediate port and having a bottom opening near and in fluid communication with the second zone inlet, and (b) a storage tank connected to and in fluid communication with the return tube, wherein the return tube is adapted to conduct liquid, after it has passed through the first zone, to the intermediate port for passage to said storage tank and adapted to conduct liquid, returning from the storage tank through the intermediate port, to the second zone inlet, whereby, when the tap is closed, liquid flows through the biocide media, through the dwell chamber, up the elongated return tube to storage for an extended time of contact between the liquid and biocide, and, when the tap is opened, liquid flows from storage into the elongated return tube, down through the second zone for removal of the biocide from the liquid, out of the outlet port, and to the tap for use.

2. A filtration apparatus as set forth in claim 1, wherein the said first zone comprises an axial-flow zone.

3. A filtration apparatus as set forth in claim 1, wherein the said second zone comprises an axial-flow zone.

4. A filtration apparatus as set forth in claim 1, wherein said first and second zones are axial-flow zones and the filtration apparatus further comprises an adjustment means for changing the length of said axially-extending elongated return tube to change the distance of the return tube bottom opening from the top wall to change the location of the second zone inlet relative to the top wall.

* * * * *